US012456426B2

(12) United States Patent
Chung

(10) Patent No.: US 12,456,426 B2
(45) Date of Patent: Oct. 28, 2025

(54) PIXEL CIRCUIT AND DISPLAY DEVICE HAVING THE SAME

(71) Applicant: Samsung Display Co., Ltd., Yongin-si (KR)

(72) Inventor: Kyung Hoon Chung, Yongin-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 0 days.

(21) Appl. No.: 18/637,666

(22) Filed: Apr. 17, 2024

(65) Prior Publication Data

US 2024/0282262 A1 Aug. 22, 2024

Related U.S. Application Data

(63) Continuation of application No. 17/749,084, filed on May 19, 2022, now Pat. No. 11,967,277.

(30) Foreign Application Priority Data

Sep. 1, 2021 (KR) ........................ 10-2021-0116561

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861;
(Continued)

(56) References Cited

U.S. PATENT DOCUMENTS 7,916,102 B2 3/2011 Chung et al.
9,135,862 B2 9/2015 Park et al.
(Continued)

FOREIGN PATENT DOCUMENTS

KR 10-2006-0031380 4/2006
KR 10-1040893 6/2011
(Continued)

*Primary Examiner* — Jeff Piziali

(74) *Attorney, Agent, or Firm* — HARNESS, DICKEY & PIERCE, P.L.C.

(57) ABSTRACT

A pixel circuit includes: a light emitting element having one end connected to a first power line supplying a first power voltage; a driving transistor for controlling an amount of current flowing to a second power voltage via the light emitting element electrically connected to a first electrode the driving transistor; an initialization transistor connected between a second electrode of the driving transistor and an initialization power line supplying an initialization voltage, the initialization transistor having a gate electrode connected to a first scan line; a compensation transistor connected between the first power line and the first electrode of the driving transistor, the compensation transistor having a gate electrode connected to a second scan line; and a storage capacitor connected between a gate electrode of the driving transistor and the second electrode of the driving transistor.

20 Claims, 8 Drawing Sheets

(52) U.S. Cl.
CPC ............... *G09G 2300/0861* (2013.01); *G09G 2310/0286* (2013.01); *G09G 2310/08* (2013.01); *G09G 2320/0233* (2013.01); *G09G 2330/021* (2013.01)

(58) Field of Classification Search
CPC ....... G09G 2310/0286; G09G 2310/08; G09G 2320/0233; G09G 2330/021; G09G 3/3266; G09G 2300/0852; G09G 2310/0251; G09G 2310/0262; G09G 2310/067; G09G 2320/045
See application file for complete search history.

(56) References Cited

U.S. PATENT DOCUMENTS

| | | | | |
|---|---|---|---|---|
| 9,953,569 | B2 * | 4/2018 | Mu | G09G 3/3225 |
| 10,181,289 | B1 * | 1/2019 | Chen | G09G 3/3233 |
| 11,322,085 | B1 * | 5/2022 | Zheng | G09G 3/3233 |
| 11,462,158 | B2 * | 10/2022 | Yin | G09G 3/3233 |
| 11,468,828 | B2 * | 10/2022 | Kim | G09G 3/3233 |
| 2005/0243037 | A1 | 11/2005 | Eom et al. | |
| 2006/0077137 | A1 | 4/2006 | Kwon | |
| 2006/0139260 | A1 * | 6/2006 | Shibusawa | G09G 3/325 345/76 |
| 2007/0139311 | A1 * | 6/2007 | Cho | G09G 3/325 345/76 |
| 2009/0079679 | A1 * | 3/2009 | Nam | G09G 3/3233 345/82 |
| 2010/0220038 | A1 * | 9/2010 | Chung | G09G 3/3233 345/76 |
| 2012/0139957 | A1 * | 6/2012 | Choi | G09G 3/3266 315/240 |
| 2012/0139961 | A1 * | 6/2012 | Choi | G09G 3/3208 315/240 |
| 2012/0268194 | A1 * | 10/2012 | Koyama | H01L 29/04 327/427 |
| 2016/0365032 | A1 * | 12/2016 | Wu | G09G 3/3291 |
| 2017/0092178 | A1 * | 3/2017 | Lee | G09G 3/3233 |
| 2017/0092198 | A1 * | 3/2017 | Ryu | G09G 3/3275 |
| 2017/0098413 | A1 * | 4/2017 | Lee | G09G 3/3233 |
| 2017/0140724 | A1 * | 5/2017 | Lin | G09G 3/3233 |
| 2017/0221420 | A1 * | 8/2017 | Zhu | G09G 3/3233 |
| 2018/0006263 | A1 * | 1/2018 | Yoon | G09G 3/3233 |
| 2018/0061915 | A1 * | 3/2018 | Yu | H10K 59/1213 |
| 2019/0259330 | A1 * | 8/2019 | Lee | H10K 59/1216 |
| 2019/0347988 | A1 * | 11/2019 | Zhang | G09G 3/3233 |
| 2020/0013337 | A1 * | 1/2020 | Cho | G09G 3/3233 |
| 2021/0210012 | A1 * | 7/2021 | Zhang | G09G 3/3233 |
| 2022/0148510 | A1 * | 5/2022 | Ryu | G09G 3/3258 |
| 2022/0208110 | A1 * | 6/2022 | Yu | G09G 3/3266 |
| 2022/0293038 | A1 * | 9/2022 | Zhao | G09G 3/3233 |

FOREIGN PATENT DOCUMENTS

| | | |
|---|---|---|
| KR | 10-1202039 | 11/2012 |
| KR | 10-1289631 | 7/2013 |
| KR | 10-1495359 | 2/2015 |
| KR | 10-1678211 | 11/2016 |
| KR | 10-2016391 | 8/2019 |

* cited by examiner

PIXEL CIRCUIT AND DISPLAY DEVICE HAVING THE SAME

CROSS REFERENCE TO RELATED APPLICATION

This is a continuation application of U.S. patent application Ser. No. 17/749,084 filed May 19, 2022 (now U.S. Pat. No. 11,967,277 issued Apr. 23, 2024), the disclosure of which is incorporated herein by reference in its entirety. U.S. patent application Ser. No. 17/749,084 claims priority from and the benefit of Korean Patent Application No. 10-2021-0116561, filed on Sep. 1, 2021, which is hereby incorporated by reference for all purposes as if fully set forth herein.

BACKGROUND

Field

Embodiments of the invention relate generally to a pixel circuit and a display device having the pixel circuit and more specifically, to a pixel circuit capable of compensating for a transistor and a display device having the pixel circuit.

DISCUSSION OF THE BACKGROUND

With the development of information technologies, the importance of a display device, as a connection medium between a user and information, has increased. Accordingly, display devices such as a liquid crystal display device and an organic light emitting display device have been widely used in the information technologies.

A display device supplies a data signal corresponding to a grayscale of an image to a plurality of pixels (e.g., pixel circuits) arranged in a matrix form, thereby displaying the image. Each of the pixels includes a light emitting element and a driving transistor for controlling an amount of current supplied to the light emitting element, corresponding to the data signal.

Meanwhile, techniques for uniformly maintaining the luminance of a screen regardless of any characteristic (e.g., a threshold voltage deviation) of the driving transistor have been required.

The above information disclosed in this Background section is only for understanding of the background of the inventive concepts, and, therefore, it may contain information that does not constitute prior art.

SUMMARY

Display devices having a pixel circuit constructed according to the principles of the invention are capable of displaying an image with a uniform luminance regardless of any characteristic (e.g., threshold voltage deviation) of a driving transistor of the pixel circuit. For example, the pixel circuit may include a light emitting element and an NMOS transistor, which are invertedly disposed, and may implement a desired luminance regardless of any characteristic of the driving transistor.

Additional features of the inventive concepts will be set forth in the description which follows, and in part will be apparent from the description, or may be learned by practice of the inventive concepts.

In accordance with an aspect of the invention, a pixel circuit includes: a light emitting element having one end connected to a first power line for supplying a first power voltage; a driving transistor for controlling an amount of current flowing to a second power voltage via the light emitting element electrically connected to a first electrode of the driving transistor; an initialization transistor connected between a second electrode of the driving transistor and an initialization power line for supplying an initialization voltage, the initialization transistor having a gate electrode connected to a first scan line; a compensation transistor connected between the first power line and the first electrode of the driving transistor, the compensation transistor having a gate electrode connected to a second scan line; and a storage capacitor connected between a gate electrode of the driving transistor and the second electrode of the driving transistor.

The pixel circuit may further include a holding capacitor connected between the first power line and the second electrode of the driving transistor.

The pixel circuit may further include a holding capacitor connected between a holding power line for supplying a DC voltage and the second electrode of the driving transistor.

The DC voltage may have one voltage of voltages supplied to the pixel circuit.

A capacitance of the holding capacitor may be greater than that of the storage capacitor.

The initialization voltage may have a voltage substantially equal to the second power voltage.

The pixel circuit may further include: a reference transistor connected between the gate electrode of the driving transistor and a reference power line for supplying a reference voltage, the reference transistor having a gate electrode connected to a third scan line; and a switching transistor connected between a data line and the gate electrode of the driving transistor, the switching transistor having a gate electrode connected to a fourth scan line.

The reference voltage may have a voltage lower than the first power voltage.

The first power voltage may have a voltage higher than a voltage obtained by subtracting a threshold voltage of the driving transistor from the reference voltage.

The reference voltage may have a predetermined voltage within a voltage range of a data signal supplied to the data line.

The pixel circuit may further include: a first emission transistor connected between another end of the light emitting element and the first electrode of the driving transistor, the first emission transistor having a gate electrode connected to an emission control line; and a second emission transistor connected between the second electrode of the driving transistor and a second power line for supplying the second power voltage, the second emission transistor having a gate electrode connected to the emission control line.

In accordance with another aspect of the invention, a pixel circuit includes: a light emitting element having one end connected to a first power line for supplying a first power voltage; a driving transistor for controlling an amount of current flowing to a second power voltage via the light emitting element electrically connected to a first electrode of the driving transistor; an initialization transistor connected between a second electrode of the driving transistor and an initialization power line for supplying an initialization voltage, the initialization transistor having a gate electrode connected to a first scan line; a compensation transistor connected between a sustain power line for supplying a sustain voltage different from the first power voltage and the first electrode of the driving transistor, the compensation transistor having a gate electrode connected to a second scan line; and a storage capacitor connected between a gate electrode of the driving transistor and the second electrode of the driving transistor.

The pixel circuit may further include a holding capacitor connected between the first power line or the sustain power line and the second electrode of the driving transistor.

The pixel circuit may further include a holding capacitor connected between a holding power line for supplying a DC voltage and the second electrode of the driving transistor.

A capacitance of the holding capacitor may be greater than that of the storage capacitor.

The initialization voltage may have a voltage substantially equal to the second power voltage.

The pixel circuit may further include: a reference transistor connected between the gate electrode of the driving transistor and a reference power line for supplying a reference voltage, the reference transistor having a gate electrode connected to a third scan line; and a switching transistor connected between a data line and the gate electrode of the driving transistor, the switching transistor having a gate electrode connected to a fourth scan line.

The reference voltage may have a voltage lower than the sustain voltage.

The sustain voltage may have a voltage higher than a voltage obtained by subtracting a threshold voltage of the driving transistor from the reference voltage.

The reference voltage may have a predetermined voltage within a voltage range of a data signal supplied to the data line.

The pixel circuit may further include: a first emission transistor connected between another end of the light emitting element and the first electrode of the driving transistor, the first emission transistor having a gate electrode connected to an emission control line; and a second emission transistor connected between the second electrode of the driving transistor and a second power line for supplying the second power voltage, the second emission transistor having a gate electrode connected to the emission control line.

In accordance with still another aspect of the invention, a display device including pixel circuits located to be connected to scan lines and data lines, wherein each pixel circuit includes: a light emitting element having one end connected to a first power line for supplying a first power voltage; a driving transistor for controlling an amount of current flowing to a second power voltage via the light emitting element electrically connected to a first electrode of the driving transistor; an initialization transistor connected between a second electrode of the driving transistor and an initialization power line for supplying an initialization voltage, the initialization transistor having a gate electrode connected to a first scan line; a compensation transistor having a first electrode connected to the first power line or a sustain power line supplied with a sustain voltage different from the first power voltage, a second electrode connected to the first electrode of the driving transistor, and a gate electrode connected to a second scan line; a storage capacitor connected between a gate electrode and the second electrode of the driving transistor; and a holding capacitor having one end connected to the first power line or a holding power line for supplying a DC voltage and another end connected to the second electrode of the driving transistor.

The pixel circuit may further include: a reference transistor connected between the gate electrode of the driving transistor and a reference power line for supplying a reference voltage, the reference transistor having a gate electrode connected to a third scan line; a switching transistor connected between a data line and the gate electrode of the driving transistor, the switching transistor having a gate electrode connected to a fourth scan line; a first emission transistor connected between another end of the light emitting element and the first electrode of the driving transistor, the first emission transistor having a gate electrode connected to an emission control line; and a second emission transistor connected between the second electrode of the driving transistor and a second power line for supplying the second power voltage, the second emission transistor having a gate electrode connected to the emission control line.

The pixel circuit may be driven in one frame divided into a first period, a second period, a third period, and a fourth period. The display device may further include a scan driver configured to supply a first scan signal to the first scan line during the first period, supply a second scan signal to the second scan line during the second period, supply a fourth scan signal to the fourth scan line during the third period, and supply a third scan signal to the third scan line during the first period and the second period.

The display device may further include an emission driver configured to supply an emission control signal having a gate-off voltage to the emission control line during the first period to the third period, and supply an emission control signal having a gate-on voltage to the emission control line during the fourth period.

The display device may further include a data driver configured to supply a data signal to the data line to be synchronized with the fourth scan signal supplied to the fourth scan line.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

In the drawing, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
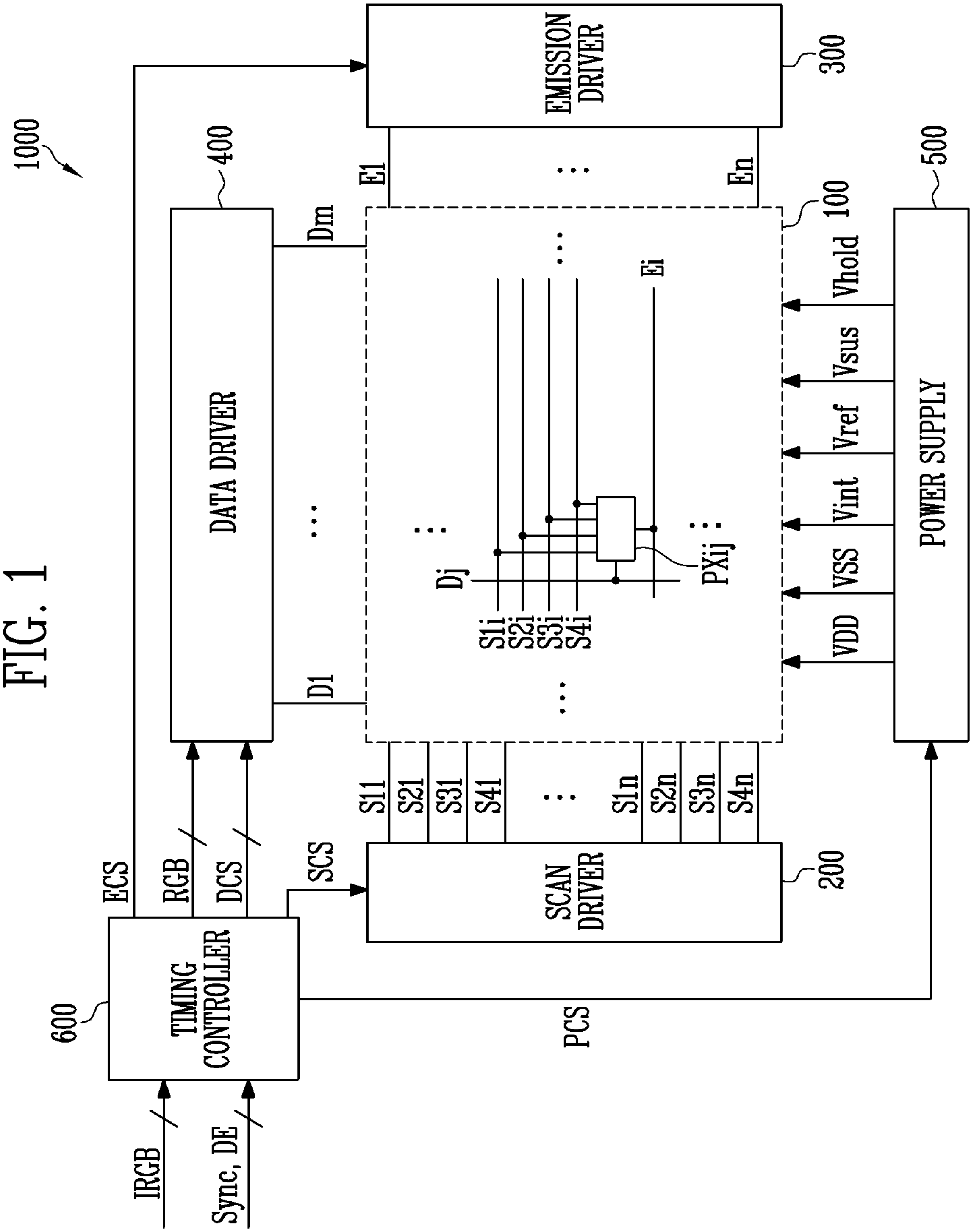
FIG. 1 is a schematic diagram of an embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments will be described in detail with reference to the accompanying drawings. The effects and characteristics of the invention and a method of achieving the effects and characteristics of the invention will be clear by referring to the embodiments described below in detail together with the accompanying drawings. However, the invention is not limited to the embodiments disclosed herein but may be implemented in various forms. The embodiments are provided by way of example only so that a person of ordinary skilled in the art can fully understand the features in the invention and the scope thereof. Therefore, the invention can be defined by the scope of the appended claims. Like reference numerals generally denote like elements throughout the specification.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein. As used herein, the singular forms are intended to include the plural forms as well, unless the context clearly indicates otherwise.

FIG. 1 is a schematic diagram illustrating a display device in accordance with an embodiment.

Referring to FIG. 1, the display device 1000 may include a display panel 100, a scan driver 200, an emission driver 300, a data driver 400, a power supply 500, and a timing controller 600.

The display panel 100 may include scan lines S11 to S1*n*, S21 to S2*n*, S31 to S3*n*, and S41 to S4*n*, emission control lines E1 to En, and data lines D1 to Dm. The display panel 110 may include a plurality of pixels PXij connected to the scan lines S11 to S1*n*, S21 to S2*n*, S31 to S3*n*, and S41 to S4*n*, the emission control lines E1 to En, and the data lines D1 to Dm (m, n, i, and j are integers greater than 1).

For example, a pixel PXij located on an i-th horizontal line (e.g., i-th pixel row) and a j-th vertical line (e.g., j-th pixel column) may be connected to a 1*i*-th scan line S1*i*, a 2*i*-th scan line S2*i*, a 3*i*-th scan line S3*i*, a 4*i*-th scan line S4*i*, a j-th data line Dj, and an i-th emission control line Ei.

The pixel PXij (e.g., pixel circuit) may include a plurality of transistors and a plurality of capacitors. The pixel PXij may be supplied with a first power voltage VDD, a second power voltage VSS, a third power voltage Vint (e.g., initialization voltage), a fourth power voltage Vref (e.g., reference voltage), a fifth power voltage Vsus (e.g., sustain voltage), and a sixth power voltage Vhold (e.g., hold voltage) through the power supply 500.

A voltage value of each of the first power voltage VDD and the second power voltage VSS is set such that a current can flow through a light emitting element. In an example, the first power voltage VDD may be set as a voltage higher than the second power voltage VSS.

The third power voltage Vint is a voltage for initializing a storage capacitor (e.g., Cst shown in FIG. 2) included in the pixel PXij. The third power voltage Vint may be set as a voltage lower than the fourth power voltage Vref. In an example, the third power voltage Vint may be set as a voltage lower than a difference voltage between the fourth power voltage Vref and a threshold voltage Vth of a driving transistor (e.g., T1 shown in FIG. 2). For example, the third power voltage Vint may be set as a voltage lower than a voltage that is obtained by subtracting the threshold voltage Vth of the driving transistor T1 from the fourth power voltage Vref.

The fourth power voltage Vref is a voltage for initializing a gate electrode of the driving transistor T1 included in the pixel PXij. The fourth power voltage Vref may be used to implement a predetermined grayscale by using a voltage difference between the fourth power voltage Vref and a data signal. To this end, the fourth power voltage Vref may be set as a predetermined voltage within a voltage range of the data signal.

The fifth power voltage Vsus (e.g., in FIG. 5) may supply a predetermined current to the driving transistor T1 when the threshold voltage Vth of the driving transistor T1 is compensated. The fifth power voltage Vsus may be set as a voltage similar or equal to the first power voltage VDD, but embodiments are not limited thereto. Additionally, the fifth power voltage Vsus may be set as a voltage higher than the fourth power voltage Vref (i.e., Vsus>Vref). In an example, the fifth power voltage Vsus may be set as a voltage higher than the difference voltage between the fourth power voltage Vref and the threshold voltage Vth of the driving transistor T1 (i.e., Vsus>Vref−Vth(T1)). For example, the fifth power voltage Vsus may be set as a voltage substantially equal to or higher than a voltage that is obtained by subtracting the threshold voltage Vth of the driving transistor T1 from the fourth power voltage Vref.

The sixth power voltage Vhold may be set as a DC voltage. In an example, the sixth power voltage Vhold may be set as any one voltage among voltages supplied to the pixel PXij.

Additionally, although a case where the first power voltage VDD, the second power voltage VSS, the third power voltage Vint, the fourth power voltage Vref, the fifth power voltage Vsus, and the sixth power voltage Vhold are all supplied from the power supply 500 has been illustrated in FIG. 1, embodiments are not limited thereto. In an example, the first power voltage VDD, the second power voltage VSS, and the fourth power voltage Vref are all supplied regardless of the structure of the pixel PXij, and at least one voltage among the third power voltage Vint, the fifth power voltage Vsus, and the sixth power voltage Vhold may not be supplied corresponding to the structure of the pixel PXij.

In an embodiment, signal lines connected to the pixel PXij may be variously set according to the circuit structure of the pixel PXij.

The scan driver 200 may receive a first control signal SCS from the timing controller 600, and supply a scan signal to each of first scan lines S11 to S1*n*, second scan lines S21 to S2*n*, third scan lines S31 to S3*n*, and fourth scan lines S41 to S4*n*, based on the first control signal SCS.

The scan signal may be set to a gate-on voltage for turning on transistors supplied with the scan signal.

For example, a scan signal supplied to a P-channel metal oxide semiconductor (PMOS) transistor may be set to a low logic level, and a scan signal supplied to an N-channel metal oxide semiconductor (NMOS) transistor may be set to a high logic level. Hereinafter, it will be understood that the term "that a scan signal is supplied" means that the scan signal is supplied with a logic level for turning on a transistor controlled by the scan signal.

For convenience of description, a case where the scan driver 200 is a single component has been illustrated in FIG. 1, but embodiments are not limited thereto. In some embodiments, the scan driver 200 may include a plurality of scan drivers to supply a scan signal to each of the first scan lines S11 to S1*n*, the second scan lines S21 to S2*n*, the third scan lines S31 to S3*n*, and the fourth scan lines S41 to S4*n*.

The emission driver 300 may supply an emission control signal to the emission control lines E1 to En, based on a second control signal ECS. For example, the emission control signal may be sequentially supplied to the emission control lines E1 to En.

Transistors connected to the emission control lines E1 to En is implemented as an NMOS transistor. The emission control signal supplied to the emission control lines E1 to En may be set to a gate-off voltage (e.g., high logic level) for turning off a transistor supplied with the emission control signal. The transistors receiving the emission control signal may be turned off when the emission control signal is supplied, and be set to a turn-on state in other cases.

The second control signal ECS may include an emission start signal and clock signals, and the emission driver 300 may be implemented as a shift register which sequentially generates and outputs the emission control signal in a pulse form by sequentially shifting the emission start signal in a pulse form, by using the clock signals.

The data driver 400 may receive a third control signal DCS from the timing controller 600. The data driver 400 may convert image data RGB in a digital form into an analog data signal (e.g., a data signal). The data driver 400 may supply a data signal to the data lines D1 to Dm, corresponding to the third control signal DCS.

The third control signal DCS may include a data enable signal for instructing output of a valid data signal, a horizontal start signal, a data clock signal, and the like. For example, the data driver 400 may include a shift register, a latch, a digital-analog converter (e.g., decoder), and buffers (e.g., amplifiers). For example, the shift register may generate a sampling signal by shifting the horizontal start signal in synchronization with the data clock signal. The latch may latch image data RGB in response to the sampling signal. The digital-analog converter may convert the latched image data (e.g., data in a digital form) into data signals in an analog form. The buffers may output the data signals to the data lines DL1 to DLm The power supply 500 may supply, to the display panel 100, the first power voltage VDD for driving the pixel PXij, the second power voltage VSS, and the fourth power voltage Vref. Also, the power supply 500 may supply, to the display panel 100, at least one voltage among the third power voltage Vint, the fifth power voltage Vsus, and the sixth power voltage Vhold.

In an example, the power supply 500 may supply, to the display panel 100, each of the first power voltage VDD, the second power voltage VSS, the third power voltage Vint, the fourth power voltage Vref, the fifth power voltage Vsus, and the sixth power voltage Vhold through a first power line, a second power line, an initialization power line, a reference power line, a sustain power line, and a hold power line.

The power supply 500 may be implemented as a power management IC (PMIC). Although a case where the power supply 500 supplies the fifth power voltage Vsus to the display panel 100 has been illustrated in FIG. 1, embodiments are not limited thereto. For example, the fifth power voltage Vsus may be supplied from an external separate power source.

The timing controller 600 may generate the first control signal SCS, the second control signal ECS, the third control signal DCS, and a fourth control signal PCS, based on the input image data IRGB, a synchronization signal Sync (e.g., a vertical synchronization signal, a horizontal synchronization signal, etc.), a data enable signal DE, a clock signal, and the like. The first control signal SCS may be supplied to the scan driver 200, the second control signal ECS may be supplied to the emission driver 300, the third control signal DCS may be supplied to the data driver 400, and the fourth control signal PCS may be supplied to the power supply 500. The timing controller 600 may generate image data RGB (e.g., frame data) by rearranging the input image data IRGB, corresponding to the arrangement of the pixels PXij in the display panel 100.

For example, at least one of the scan driver 200, the emission driver 300, the data driver 400, the power supply 500, and the timing controller 600 may be formed in the display panel 100, or be implemented as an integrated circuit to be connected to the display panel 100. Also, at least two of the scan driver 200, the emission driver 300, the data driver 400, the power supply 500, and the timing controller 600 may be implemented as one integrated circuit. For example, the data driver 400 and the timing controller 600 may be implemented as one integrated circuit.

Figure 2:
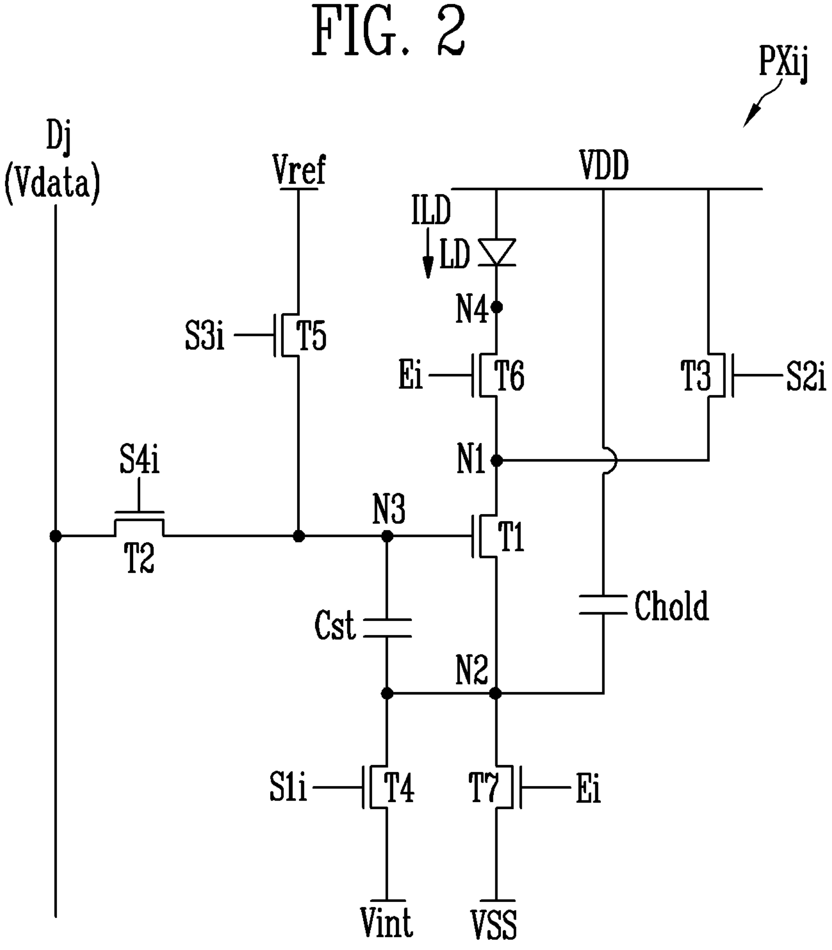
FIG. 2 is a schematic diagram of an embodiment of a representative pixel of the display device of FIG. 1.

FIG. 2 is a diagram illustrating an example of the pixel provided in the display device shown in FIG. 1.

For convenience of description, a pixel PXij which is located on an i-th horizontal line (e.g., i-th pixel row) and is connected to a j-th data line Dj is illustrated in FIG. 2. However, the pixels included in the display panel 100 substantially have the same structure, and therefore, redundant descriptions will be omitted for descriptive convenience.

Referring to FIG. 2, the pixel PXij provided in the display panel 100 may include a light emitting element LD, transistors T1 to T7, a storage capacitor Cst, and a hold capacitor Chold.

A first electrode (e.g., anode electrode) of the light emitting element LD may be connected to the first power line which is supplied with the first power voltage VDD, and a second electrode (e.g., cathode electrode) of the light emitting element LD may be connected to a fourth node N4. For example, the light emitting element LD provided in the pixel PXij may be disposed in an inverted structure in which the light emitting element LD is electrically connected to a first electrode (e.g., drain electrode) of a driving transistor T1. The light emitting element LD generates light with a predetermined luminance corresponding to an amount of current supplied from the first power voltage VDD to the driving transistor T1.

In an embodiment, the light emitting element LD may be an organic light emitting diode including an organic emitting layer. In another embodiment, the light emitting element LD may be an inorganic light emitting element formed of an inorganic material. Alternatively, the light emitting element LD may have a form in which inorganic light emitting elements are connected in parallel and/or series between the first power voltage VDD and the fourth node N4.

The first electrode of the driving transistor T1 may be connected to a first node N1, and a second electrode of the driving transistor T1 may be connected to a second node N2. A gate electrode of the driving transistor T1 may be connected to a third node N3. The driving transistor T1 may control a driving current ILD flowing from the first power voltage VDD to the second power voltage VSS via the light emitting element LD, corresponding to a voltage of the third node N3. To this end, the first power voltage VDD may be set as a voltage higher than the second power voltage VSS.

A second transistor T2 (e.g., switching transistor) may be connected between the j-th data line Dj and the third node N3. A gate electrode of the second transistor T2 may be connected to the 4*i*-th scan line S4*i*. The second transistor T2 may be turned on when a scan signal is supplied to the 4*i*-th scan line S4*i*, to electrically connect the j-th data line Dj and the third node N3 to each other.

A first electrode of a third transistor T3 (e.g., compensation transistor) may be connected to the first power line which is supplied with the first power voltage VDD, and a second electrode of the third transistor T3 may be connected to the first node N1. A gate electrode of the third transistor T3 may be connected to the 2*i*-th scan line S2*i*. The third transistor T3 may be turned on when a scan signal is supplied to the 2*i*-th scan line S2*i*, to supply the first power voltage VDD to the first electrode of the driving transistor T1 (e.g., the first node N1).

A first electrode of a fourth transistor T4 (e.g., initialization transistor) may be connected to the second node N2, and a second electrode of the fourth transistor T4 may be connected to the initialization power line which is supplied with the third power voltage Vint. A gate electrode of the fourth transistor T4 may be connected to the 1*i*-th scan line S1*i*. The fourth transistor T4 may be turned on when a scan signal is supplied to the 1*i*-th scan line S1*i*, to supply the third power voltage Vint to the second electrode of the driving transistor T1 (e.g., the second node N2).

A first electrode of a fifth transistor T5 (e.g., reference transistor) may be connected to the reference power line which is supplied with the fourth power voltage Vref, and a second electrode of the fifth transistor T5 may be connected to the gate electrode of the driving transistor T1 (e.g., the third node N3). A gate electrode of the fifth transistor T5 may be connected to the 3*i*-th scan line S3*i*. The fifth transistor T5 may supply the fourth power voltage Vref to the third node N3 when a scan signal is supplied to the 3*i*-th scan line S3*i*.

A first electrode of a sixth transistor T6 (e.g., first emission transistor) may be connected to the second electrode of the light emitting element LD (e.g., the fourth node N4), and a second electrode of the sixth transistor T6 may be connected to the first node N1. A gate electrode of the sixth transistor T6 may be connected to the i-th emission control line Ei. The sixth transistor T6 may be turned on when an emission control signal having a gate-on voltage is supplied to the i-th emission control line Ei. When the sixth transistor T6 is turned on, the light emitting element LD and the driving transistor T1 may be electrically connected to each other.

A first electrode of a seventh transistor T7 (e.g., second emission transistor) may be connected to the second node N2, and a second electrode of the seventh transistor T7 may be connected to the second power line which is supplied with the second power voltage VSS. A gate electrode of the seventh transistor T7 may be connected to the i-th emission control line Ei. The seventh transistor T7 may be turned on when the emission control signal having the gate-on voltage is supplied to the i-th emission control line Ei. When the seventh transistor T7 is turned on, the driving transistor T1 and the second power voltage VSS may be electrically connected to each other.

For example, when the sixth transistor T6 and the seventh transistor T7 are turned on, a current path may be formed, which is continued from the first power voltage VDD to the second power voltage VSS via the driving transistor T1. Thus, the driving current ILD may flow through the light emitting element LD.

One end of the storage capacitor Cst may be connected to the third node N3, and the other end of the storage capacitor Cst may be connected to the second node N2. The storage capacitor Cst may store a difference voltage between the third node N3 and the second node N2.

One end of the hold capacitor Chold may be connected to the first power line which is supplied with the first power voltage VDD, and the other end of the hold capacitor Chold may be connected to the second node N2. The hold capacitor Chold may have a capacitance (e.g., storage capacity or charge capacity) greater than that of the storage capacitor Cst. In an example, the hold capacitor Chold may be set to have a capacitance 10 times (e.g., over 3 to 5 times) greater than that of the storage capacitor Cst. The hold capacitor Chold may minimize a change in voltage of the second node N2, corresponding to a change in voltage of the third node N3.

Additionally, in the pixel PXij, the light emitting element LD is invertedly disposed. To this end, the transistors T1 to T7 may be implemented as an NMOS transistor.

Figure 3:
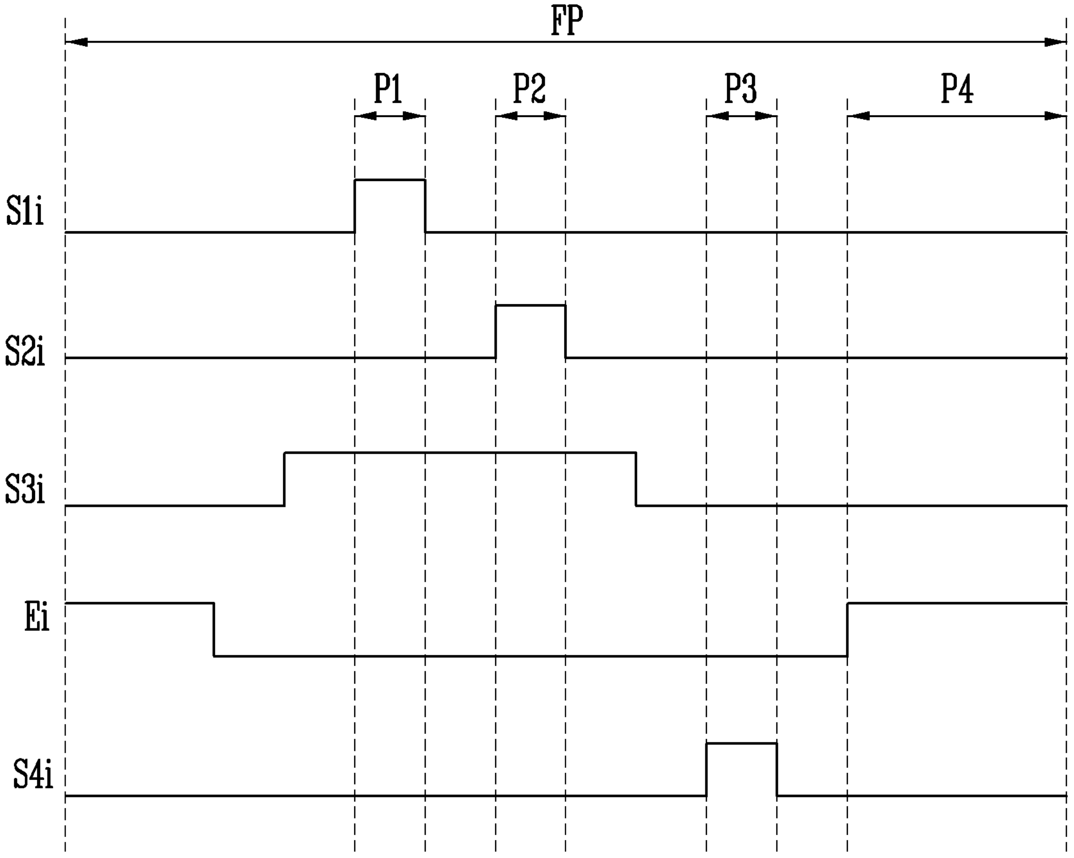
FIG. 3 is a timing diagram illustrating a method of driving the pixel of FIG. 2 in accordance with an embodiment.

FIG. 3 is a timing diagram illustrating driving of the pixel shown in FIG. 2 in accordance with an embodiment.

Referring to FIG. 3, one frame FP may include a first period P1 as an initialization period, a second period P2 as a compensation period, a third period P3 as a data writing period, and a fourth period P4 as an emission period.

First, during the first period P1 to the third period P3, an emission control signal having a gate-off voltage (e.g., a low logic level) may be supplied to the i-th emission control line Ei. When the emission control signal having the gate-off voltage is supplied to the i-th emission control line Ei, the sixth transistor T6 and the seventh transistor T7 may be turned off. When the sixth transistor T6 and the seventh transistor T7 are turned off, the current path formed from the first power voltage VDD to the second power voltage VSS may be blocked, and accordingly, the light emitting element LD may maintain a non-emission state. For example, during the first period P1 to the third period P3, the light emitting element LD may be set to the non-emission state.

During the first period P1, a scan signal is supplied to the 1*i*-th scan line S1*i* and the 3*i*-th scan line S3*i*.

When the scan signal is supplied to the 1*i*-th scan line S1*i*, the fourth transistor T4 may be turned on, and accordingly, the third power voltage Vint is supplied to the second node N2. Then, during the first period P1, the voltage of the second node N2 may be initialized (or set) to the third power voltage Vint.

When the scan signal is supplied to the 3*i*-th scan line S3*i*, the fifth transistor T5 may be turned on, and accordingly, the fourth power voltage Vref is supplied to the third node N3. Then, during the first period P1, the voltage of the third node N3 may be initialized (or set) to the fourth power voltage Vref.

During the second period P2, a scan signal may be supplied to the 2*i*-th scan line S2*i*, and the 3*i*-th scan line S3*i* may maintain the supply of the scan signal during the first period P1.

When the scan signal is supplied to the 3*i*-th scan line S3*i*, the fifth transistor T5 may maintain the turn-on state, and accordingly, the voltage of the third node N3 maintains the fourth power voltage Vref.

When the scan signal is supplied to the 2*i*-th scan line S2*i*, the third transistor T3 may be turned on. When the third transistor T3 is turned on, the first power voltage VDD may be supplied to the first node N1.

The first power voltage VDD may be set as a voltage higher than the fourth power voltage Vref (i.e., VDD>Vref). In an example, the first power voltage VDD may be set as a voltage higher than a difference voltage between the fourth power voltage Vref and a threshold voltage Vth of the driving transistor T1 (i.e., VDD>Vref>Vth(T1)). For example, the first power voltage VDD may be set as a voltage higher than a voltage that is obtained by subtracting the threshold voltage Vth of the driving transistor T1 from the fourth power voltage Vref.

Since the first power voltage VDD is set as a voltage higher than the fourth power voltage Vref, during the second period P2, the voltage of the second node N2 may increase up to a voltage corresponding to the difference between the fourth power voltage Vref and the threshold voltage Vth of the driving transistor T1. For example, during the second period P2, the voltage of the second node N2 may increase up to a voltage that is obtained by subtracting the threshold voltage Vth of the driving transistor T1 from the fourth power voltage Vref.

For example, during the second period P2, the voltage of the third node N3 may be set as the fourth power voltage Vref, and the voltage of the second node N2 may be set as a voltage obtained by subtracting the threshold voltage Vth of the driving transistor T1 from the fourth power voltage Vref. Therefore, during the second period P2, the threshold voltage Vth of the driving transistor T1 may be stored in the storage capacitor Cst. Accordingly, the threshold voltage Vth of the driving transistor T1 can be compensated.

Additionally, during the second period P2, the first power voltage VDD may be supplied to the first node N1 via the third transistor T3. For example, the first power voltage VDD does not pass through the light emitting element LD but may be supplied to the first node N1. Accordingly, the light emitting element LD can be prevented from unnecessarily emitting light. Further, since the first power voltage VDD does not pass through the light emitting element LD but is supplied to the first node N1, the reliability of driving the pixels can be ensured. Further, the compensation for the threshold voltage Vth of the driving transistor T1 may be improved or accurate.

During the third period P3, a scan signal may be supplied to the 4*i*-th scan line S4*i*. When the scan signal is supplied to the 4*i*-th scan line S4*i*, the second transistor T2 may be turned on. When the second transistor T2 is turned on, a data signal supplied to the j-th data line Dj may be supplied to the third node N3. For example, the data driver 400 may supply the data signal to the j-th data line Dj to be synchronized with the scan signal supplied to the 4*i*-th scan line S4*i* during the third period P3.

For example, during the third period P3, the voltage of the third node N3 may be changed from the fourth power voltage Vref to a voltage Vdata of the data signal. In an example, the voltage of the third node N3 may be increased from the fourth power voltage Vref to the voltage Vdata of the data signal, corresponding to a predetermined grayscale, during the third period P3. Further, the voltage of the third node N3 may be decreased from the fourth power voltage Vref to the voltage Vdata of the data signal, corresponding to a black grayscale, or the like, during the third period P3.

For example, since a capacitance of the hold capacitor Chold is greater than that of the storage capacitor Cst, the second node N2 may maintain about the difference voltage between the fourth power voltage Vref and the threshold voltage Vth of the driving transistor T1. For example, the second node N2 may maintain about a voltage that is obtained by subtracting the threshold voltage Vth of the driving transistor T1 from the fourth power voltage Vref.

During the fourth period P4, an emission control signal having a gate-on voltage (e.g., a high logic level) may be supplied to the i-th emission control line Ei. When the emission control signal having the gate-on voltage is supplied, the sixth transistor T6 and the seventh transistor T7 may be turned on.

When the sixth transistor T6 is turned on, the fourth node N4 and the first node N1 may be electrically connected to each other. For example, when the sixth transistor T6 is turned on, the light emitting element LD and the driving transistor T1 may be electrically connected to each other.

When the seventh transistor T7 is turned on, the second node N2 and the second power voltage VSS may be electrically connected to each other. For example, when the seventh transistor T7 is turned on, the driving transistor T1 may be electrically connected to the second power voltage VSS. Since the third node N3 is set to a floating state, the voltage difference between the third node N3 and the second node N2 is constantly maintained by the storage capacitor Cst, and therefore, the voltage of the gate electrode of the driving transistor T1 (e.g., the third node N3) may be changed from a voltage (e.g., Vdata) of a first data signal to a voltage (e.g., Vdata+ΔV, (ΔV=VSS−(Vref−Vth)) of a second data signal.

When the sixth transistor T6 and the seventh transistor T7 are turned on, a driving current ILD may flow from the first power voltage VDD to the second power voltage VSS via the light emitting element LD, the sixth transistor T6, the driving transistor T1, and the seventh transistor T7. The driving current ILD may be expressed as the following Equation 1.

Equation 1

$$ILD = \frac{k}{2} * (Vgs - Vth)^2 = \frac{k}{2} * [(Vdata + \Delta V) - VSS - Vth]^2 = \frac{k}{2} * [(Vdata + VSS - Vref + Vth) - VSS - Vth]^2 = \frac{k}{2} * (Vdata - Vref)^2$$

In Equation 1, k denotes a constant, and Vgs denotes a difference voltage between a gate electrode and a source electrode of the driving transistor T1.

Referring to Equation 1, the driving current ILD flowing through the light emitting element LD during the fourth period P4 is not influenced by the threshold voltage Vth of the driving transistor T1 and the second power voltage VSS. Thus, in the embodiment, the luminance of an image output from the display panel 100 can be uniformly maintained regardless of the threshold voltage Vth of the driving transistor T1 and the second power voltage VSS.

For example, pixels PXij implement a luminance corresponding to the data signal while sequentially repeating the first period P1 to the fourth period P4 in units of horizontal lines.

Figure 4:
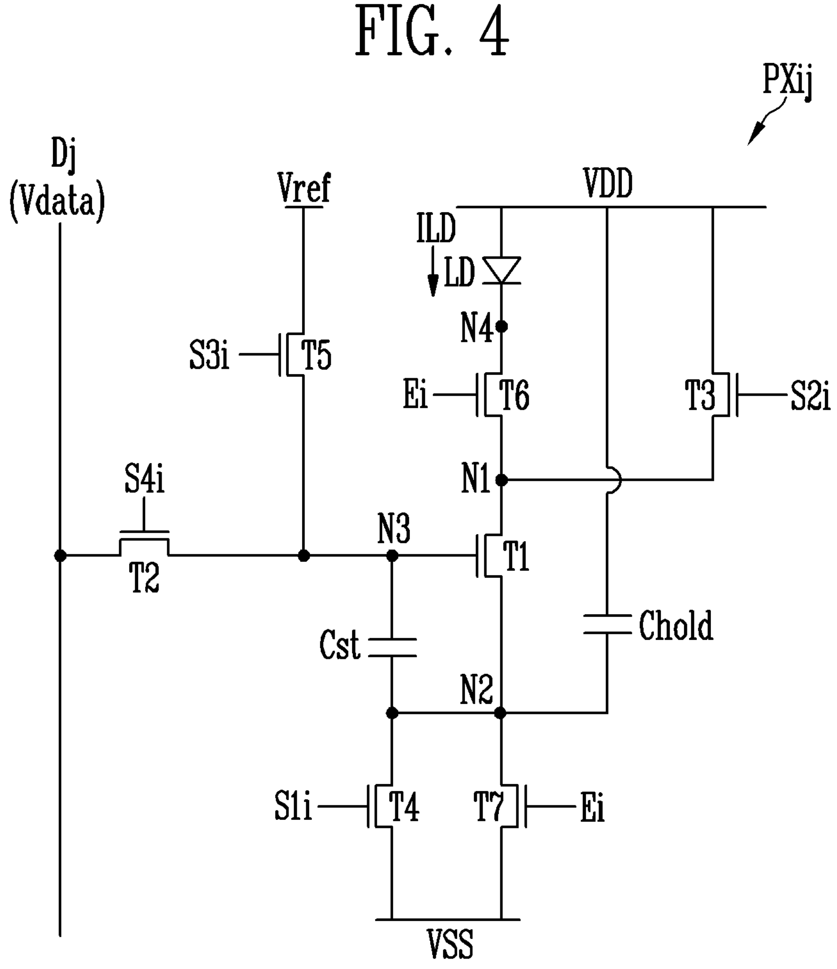
FIGS. 4, 5, 6, 7, and 8 are diagrams illustrating other embodiments of the pixel of FIG. 2.

FIG. 4 is a diagram illustrating another embodiment of the pixel included in the display shown in FIG. 1. In FIG. 4, a component different from that of the pixel shown in FIG. 2 will be mainly described for descriptive convenience.

Referring to FIG. 4, a pixel PXij in accordance with this embodiment may include a fourth transistor T4 located between the second node N2 and the second power line which is supplied with the second power voltage VSS.

For example, the pixel PXij shown in FIG. 4 may be configured substantially identically to the pixel PXij shown in FIG. 2, except that the fourth transistor T4 is connected to the second power voltage VSS instead of the third power voltage Vint.

When the fourth transistor T4 is connected to the second power voltage VSS, the third power voltage Vint is not supplied to the pixel PXij, and accordingly, the configuration of the pixel PXij can be simplified.

Additionally, the fourth transistor T4 shown in FIGS. 5 to 8 may be modified to be connected to the second power voltage VSS instead of the third power voltage Vint.

Figure 5:
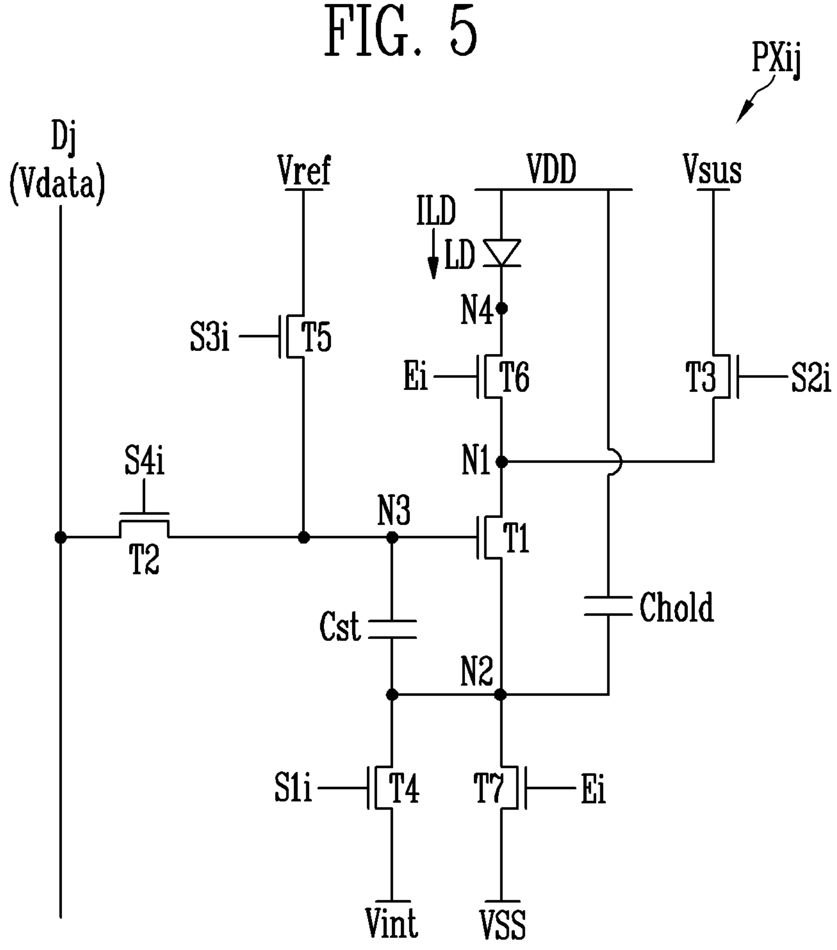

FIG. 5 is a diagram illustrating another embodiment of the pixel included in the display shown in FIG. 1. In FIG. 5, a component different from that of the pixel shown in FIG. 2 will be mainly described for descriptive convenience.

Referring to FIG. 5, a pixel PXij in accordance with this embodiment may include a third transistor T3 located between the sustain power line which is supplied with the fifth power voltage Vsus and the first node N1. For example, the pixel PXij shown in FIG. 5 may be configured substantially identically to the pixel PXij shown in FIG. 2, except that the third transistor T3 is connected to the fifth power voltage Vsus instead of the first power voltage VDD.

An operation process will be briefly described in conjunction with FIG. 3. First, during the first period P1, the fourth transistor T4 may be turned on such that the third power voltage Vint is supplied to the second node N2, and the fifth transistor T5 may be turned on such that the fourth power voltage Vref is supplied to the third node N3.

During the second period P2, the fifth transistor T5 may maintain the turn-on state, and accordingly, the third node N3 maintains the fourth power voltage Vref. Also, during the second period P2, the third transistor T3 may be turned on by the scan signal supplied to the 2*i*-th scan line S2*i*. When the third transistor T3 is turned on, the fifth power voltage Vsus may be supplied to the first node N1.

As described above, the fifth power voltage Vsus may be set as a voltage higher than the fourth power voltage Vref. Therefore, during the second period P2, the voltage of the second node N2 may increase up to a voltage corresponding to the difference between the fourth power voltage Vref and the threshold voltage Vth of the driving transistor T1. For example, during the second period P2, the voltage of the second node N2 may increase up to a voltage that is obtained by subtracting the threshold voltage Vth of the driving transistor T1 from the fourth power voltage Vref. Thus, during the second period P2, the threshold voltage Vth of the driving transistor T1 is stored in the storage capacitor Cst. Accordingly, the threshold voltage Vth of the driving transistor T1 can be compensated.

Additionally, during the second period P2, the fifth power voltage Vsus may be supplied to the first node N1 via the third transistor T3. For example, the fifth power voltage Vsus does not pass through the light emitting element LD but may be supplied to the first node N1. Accordingly, the reliability of driving the pixels can be ensured. Further, the compensation for the threshold voltage Vth of the driving transistor T1 may be improved or accurate.

Also, since the fifth power voltage Vsus does not supply any current to the pixels PXij, the pixel PXij can be more stably driven.

In detail, during the compensation period (e.g., the second period P2) of pixels PXij located on the i-th horizontal line, pixels located on the other horizontal lines may be set to an emission state. When the pixels located on the other horizontal lines are set to the emission state, a predetermined current may be supplied to the pixels located on the other horizontal lines from the first power voltage VDD, and accordingly, a predetermined voltage drop may be occurred in the first power voltage VDD.

On the other hand, the fifth power voltage Vsus does not supply any current to the pixels located on the other horizontal lines, and accordingly, the voltage drop may not be occurred in the fifth power voltage Vsus. For example, the voltage drop of the fifth power voltage Vsus may be minimized. Thus, when the threshold voltage Vth of the driving transistor T1 is compensated by using the fifth power voltage Vsus, the stability of driving the pixels can be ensured. Further, the compensation for the threshold voltage Vth of the driving transistor T1 may be improved or accurate.

During the third period P3, the voltage of the third node N3 may be changed from the fourth power voltage Vref to the voltage Vdata of the data signal. For example, during the third period P3, the pixel PXij may be charged with a voltage corresponding to the data signal.

During the fourth period P4, the sixth transistor T6 and the seventh transistor T7 may be turned on, and accordingly, the driving current ILD, which is generated according Equation 1, may flow through the light emitting element LD. For example, during the fourth period P4, the light emitting element LD may generate light with a predetermined luminance corresponding to the data signal.

Figure 6:
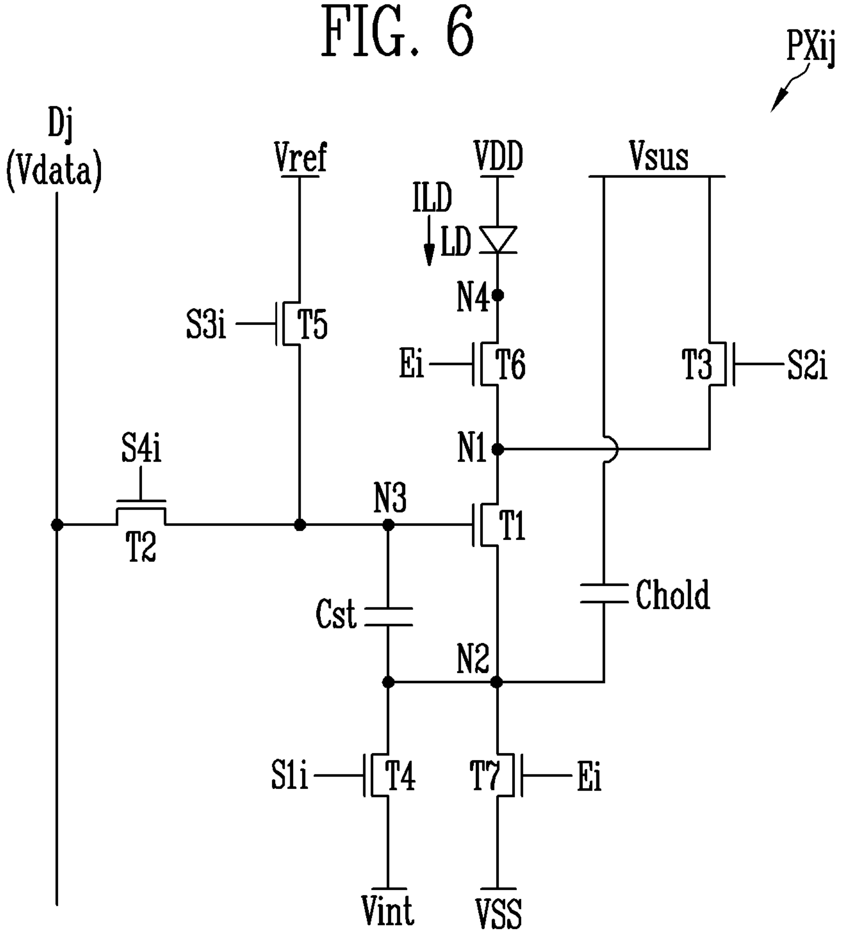

FIG. 6 is a diagram illustrating another embodiment of the pixel included in the display shown in FIG. 1. In FIG. 6, a component different from that of the pixel shown in FIG. 5 will be mainly described for descriptive convenience.

Referring to FIG. 6, a pixel PXij in accordance with this embodiment includes a hold capacitor Chold located between the sustain power line which is supplied with the fifth power voltage Vsus and the second node N2.

The hold capacitor Chold may minimize a change in voltage of the second node N2. To this end, the hold capacitor Chold may be set to have a capacitance greater than that of the storage capacitor Cst. One end of the hold capacitor Chold may be connected to the fifth power voltage Vsus, and the other end of the hold capacitor Chold may be connected to the second node N2.

The hold capacitor Chold is used to minimize the change (e.g., fluctuation) in voltage of the second node N2, and a DC voltage may be supplied to the one end of the hold capacitor Chold. FIG. 6 shows a case where the fifth power voltage Vsus is supplied to the one end of the hold capacitor Chold.

Figure 7:
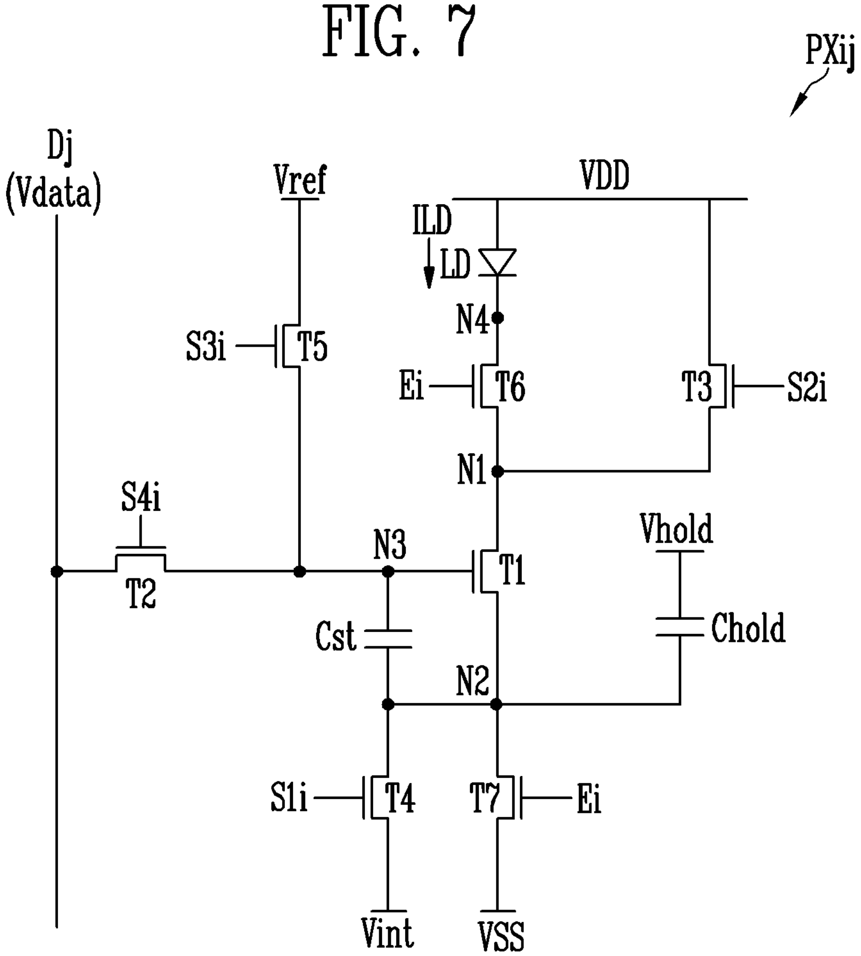

FIG. 7 is a diagram illustrating another embodiment of the pixel included in the display shown in FIG. 1. In FIG. 7, a component different from that of the pixel shown in FIG. 2 will be mainly described for descriptive convenience.

Referring to FIG. 7, a pixel PXij in accordance with this embodiment may include a hold capacitor Chold located between the hold power line which is supplied with the sixth power voltage Vhold and the second node N2.

The sixth power voltage Vhold may be set as a DC voltage. In an example, the sixth power voltage Vhold may be set as any one voltage among DC voltages supplied to the pixel PXij. In an example, the sixth power voltage Vhold may be set as any one of the second power voltage VSS, the third power voltage Vint, the fourth power voltage Vref, and a ground voltage GND.

Figure 8:
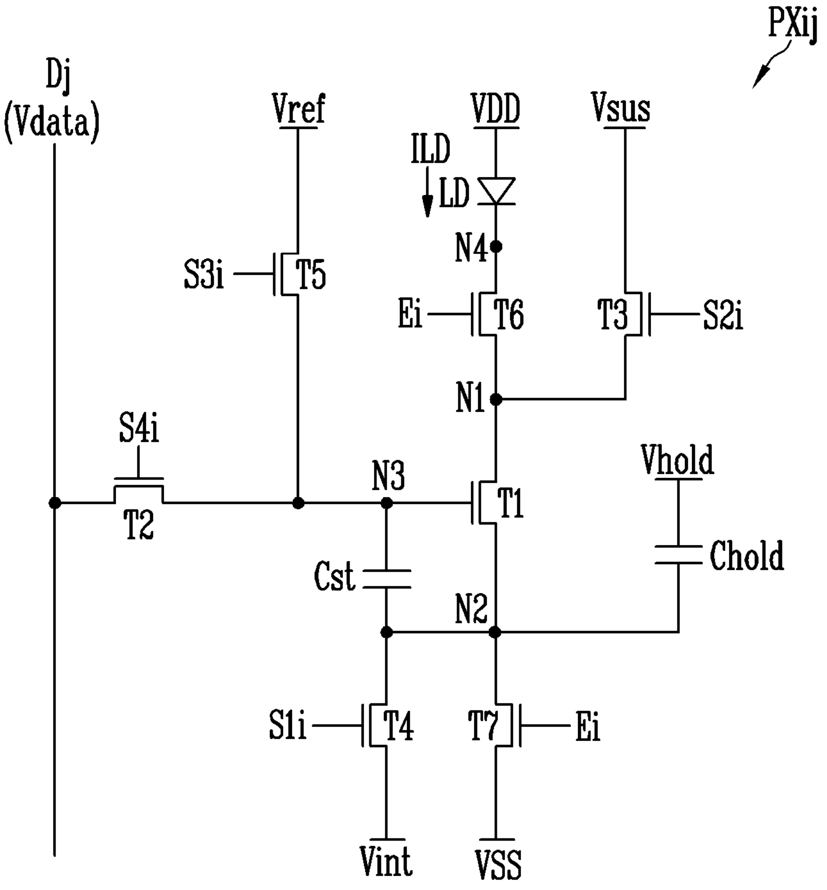

For example, the hold capacitor Chold may be connected to the sixth power voltage Vhold, even when the third transistor T3 is connected to the fifth power voltage Vsus as shown in FIG. 8. The sixth power voltage Vhold may be set as any one of the second power voltage VSS, the third power voltage Vint, the fourth power voltage Vref, the fifth power voltage Vsus, and the ground voltage GND.

In accordance with the embodiments, the pixel circuit can implement an image with a uniform luminance regardless of any characteristic (e.g., threshold voltage deviation) of the driving transistor T1.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pixel comprising:

a light emitting element including a first electrode and a second electrode, wherein the first electrode is directly connected to a first power line for supplying a first power voltage;

a first transistor including a first electrode, a second electrode, and a gate electrode, the first electrode of the first transistor being electrically connected to the second electrode of the light emitting element, the first transistor being configured to control an amount of driving current flowing from the first electrode of the first transistor to a second power line via the second electrode of the first transistor, the second power line for supplying a second power voltage;

a second transistor including a gate electrode connected to an emission control line and connected between the first electrode of the first transistor and the second electrode of the light emitting element;

a third transistor connected between the second electrode of the first transistor and the second power line for supplying the second power voltage;

a fourth transistor including a gate electrode connected to a first scan line and connected between a third power line and the second transistor, the third power line for supplying a third power voltage, the third power voltage being externally supplied to the pixel; and a first capacitor connected between the gate electrode of the first transistor and the second electrode of the first transistor, the first capacitor being directly connected to each of the gate electrode of the first transistor and the second electrode of the first transistor.

2. The pixel of claim 1, further comprising a second capacitor, wherein the second capacitor comprises a first end connected to the second electrode of the first transistor.

3. The pixel of claim 2, wherein the second capacitor further comprises a second end connected to a fourth power line for supplying the second power voltage.

4. The pixel of claim 2, wherein the second capacitor further comprises a second end connected to the second power line.

5. The pixel of claim 2, wherein a capacitance of the second capacitor is greater than that of the first capacitor.

6. The pixel of claim 1, wherein the fourth transistor is electrically connected to the second electrode of the light emitting element.

7. The pixel of claim 1, further comprising a fifth transistor, wherein the fifth transistor includes a gate electrode connected to a second scan line and is connected between the gate electrode of the first transistor and a fifth power line, and wherein a fourth power voltage is supplied to the fifth power line.

8. The pixel of claim 7, wherein a voltage of the fourth power voltage is lower than a voltage of the first power voltage.

9. The pixel of claim 7, wherein a voltage of the third power voltage is higher than a voltage obtained by subtracting a threshold voltage of the first transistor from the fourth power voltage.

10. The pixel of claim 7, further comprising a sixth transistor, wherein the sixth transistor includes a gate electrode connected to a third scan line and is connected between a data line and the gate electrode of the first transistor.

11. The pixel of claim 7, wherein a scan signal is supplied to the second scan line in a first period corresponding to an initialization period, and wherein the fourth power voltage is supplied to the gate electrode of the first transistor.

12. The pixel of claim 7, wherein a scan signal is supplied to the first scan line in a second period corresponding to a compensation period, and wherein the third power voltage is supplied to the second transistor.

13. The pixel of claim 12, wherein the third power voltage is supplied to the first transistor in the second period.

14. The pixel of claim 12, wherein the fourth power voltage is supplied to the gate electrode of the first transistor in the second period.

15. The pixel of claim 1, wherein the first transistor is implemented as an NMOS transistor.

16. The pixel of claim 1, wherein the first electrode of the light emitting element is an anode electrode, and the second electrode of the light emitting element is a cathode electrode.

17. A display device comprising:

a display panel wherein a pixel is disposed and a first scan line and an emission control line connected to the pixel are disposed;

a scan driver to supply a scan signal to the first scan line; and an emission driver to supply an emission control signal to the emission control line, wherein the pixel comprises:

a light emitting element including a first electrode and a second electrode, wherein the first electrode is directly connected to a first power line for supplying a first power voltage;

a first transistor including a first electrode, a second electrode, and a gate electrode, the first electrode of the first transistor being electrically connected to the second electrode of the light emitting element, the first transistor being configured to control an amount of driving current flowing from the first electrode of the first transistor to a second power line via the second electrode of the first transistor, the second power line for supplying a second power voltage;

a second transistor including a gate electrode connected to the emission control line and connected between the first electrode of the first transistor and the second electrode of the light emitting element;

a third transistor connected between the second electrode of the first transistor and the second power line for supplying the second power voltage;

a fourth transistor including a gate electrode connected to the first scan line and connected between a third power line and the second transistor, the third power line for supplying a third power voltage, the third power voltage being externally supplied to the pixel; and a first capacitor connected between the gate electrode of the first transistor and the second electrode of the first transistor the first capacitor being directly connected to each of the gate electrode of the first transistor and the second electrode of the first transistor.

18. The display device of claim 17, wherein the pixel further comprises a second capacitor, and wherein the second capacitor comprises:

a first end connected to the second electrode of the first transistor; and a second end connected to the second power line.

19. The display device of claim 17, wherein the scan driver is configured to supply the scan signal to the first scan line to turn on the fourth transistor, and wherein the scan signal has a high logic level.

20. The display device of claim 17, wherein the emission driver is configured to supply the emission control signal to the emission control line to turn off the second transistor, and wherein the emission control signal has a low logic level.

* * * * *